W. G. BRUNING.
ADJUSTABLE TWINE HOLDER.
APPLICATION FILED JUNE 7, 1917.
1,295,111.
Patented Feb. 25, 1919.
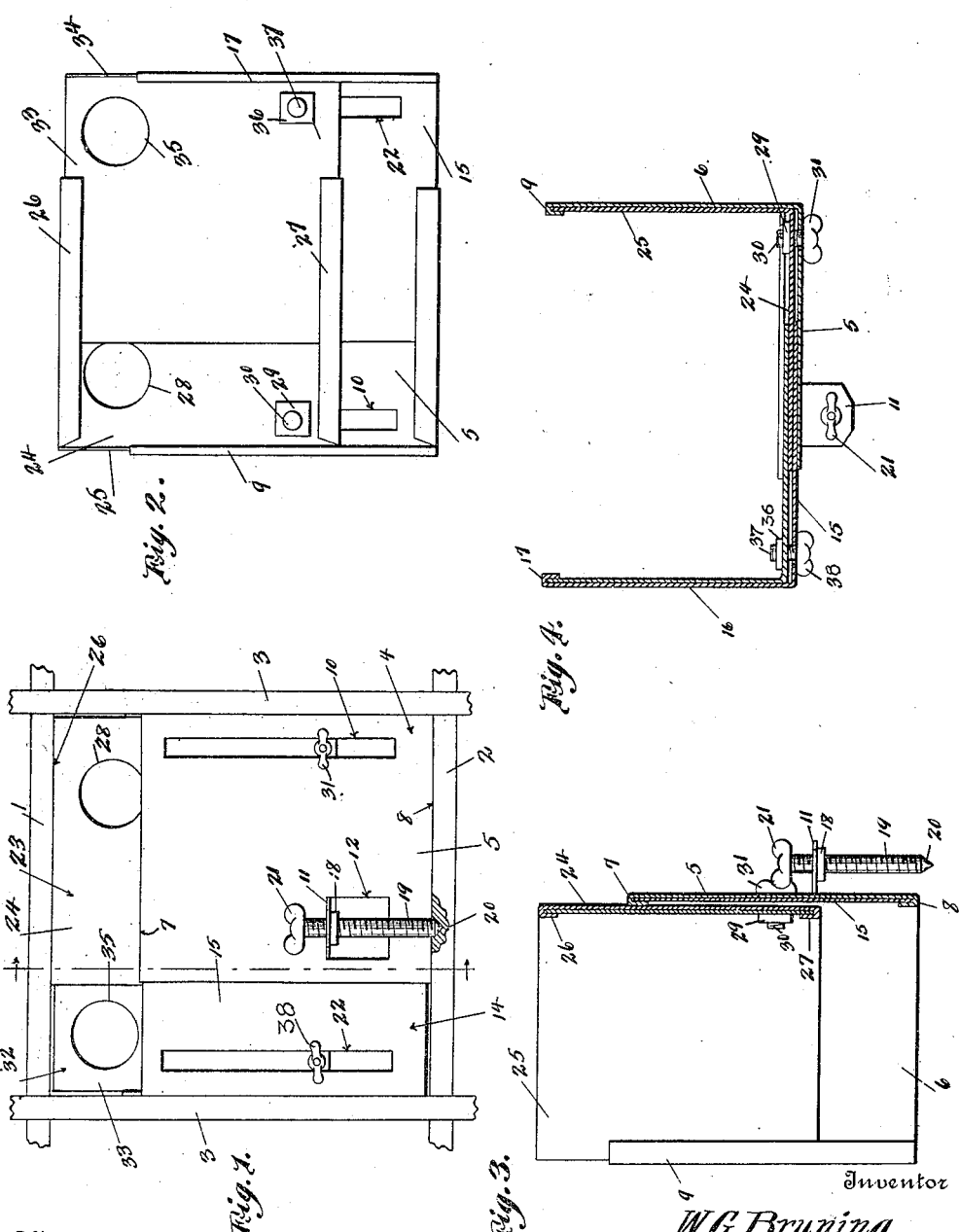
Inventor
W. G. Bruning.
By C. A. Snow & Co.
Attorney

UNITED STATES PATENT OFFICE.

WILLIAM GEORGE BRUNING, OF FREMONT, NEBRASKA.

ADJUSTABLE TWINE-HOLDER.

1,295,111.　　　　Specification of Letters Patent.　　Patented Feb. 25, 1919.

Application filed June 7, 1917. Serial No. 173,365.

*To all whom it may concern:*

Be it known that I, WILLIAM GEORGE BRUNING, a citizen of the United States, residing at Fremont, in the county of Dodge and State of Nebraska, have invented a new and useful Adjustable Twine-Holder, of which the following is a specification.

By way of explanation it may be stated that a recent regulation of the Post Office Department requires that twine shall be reused. The twine ordinarily, having been used once, is rolled up into balls. These balls, which are made by hand, cannot be used by pulling the cord out of the center of the ball, it being necessary to unroll the cord from the surface of the ball. As a consequence, the balls roll about and a receptacle of some sort must be provided for them.

In view of the foregoing, one object of the present invention is to provide a twine holder which, being assembled with a pigeon hole, will be effective to hold a ball of twine against rolling about, the end of the twine being always accessible.

Another object of the invention is to provide a twine holder of the kind above mentioned, which may be expanded, both horizontally and vertically, so as to accommodate itself to pigeon holes of different sizes.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in front elevation, a pigeon hole into which the twine holder forming the subject matter of this application has been inserted;

Fig. 2 is a rear elevation of the twine holder;

Fig. 3 is a vertical section of the twine holder;

Fig. 4 is a horizontal section of the twine holder.

In Fig. 1 of the drawings, there is shown a pigeon hole comprising a top 1, a bottom 2 and sides 3. It is with such a pigeon hole that the device forming the subject matter of this application is adapted to be assembled.

The structure hereinafter claimed preferably is made of metal throughout and includes a main member denoted generally by the numeral 4, the main member 4 comprising a front 5 and a side 6 disposed at right angles to the front. The upper edge of the front 5 is bent downwardly and rearwardly to form a top guide 7, and the lower edge of the front is bent upwardly and rearwardly to form a bottom guide 8. All of the guides hereinafter described preferably are made in this way. The rear edge of the side 6 is provided with a guide 9. In the front 5 near to the side 6 is fashioned an elongated vertical slot 10. From the front 4 a lip 11 is struck, the lip being located near to the inner vertical edge of the side 5, the lip forming an opening 12 in the front. A nut 18 is soldered or secured otherwise to the lip 11 and a screw 19, constituting a holding element, is threaded into the nut, the screw being provided at its lower end with an entering point 20, and being supplied at its upper end with a turning head 21.

The invention comprises a main member denoted generally by the numeral 14 and including a front 15 and a side 16 disposed at right angles to the front. The side 16 is provided along its rear edge with a guide 17. The front 15 of the main member 14 has a slot 22 like the slot 10. The inner end of the front 15 of the main member 14 is slidably received within the guides 7 and 8 which constitute a part of the front 5 of the main member 4, the construction being such that an expansion and a contraction of the structure as thus far described is possible.

The invention includes an auxiliary member denoted generally by the numeral 23 and comprising a front 24 and a side 25 disposed at right angles to the front. The front 24 is provided with a top guide 26 and with a bottom guide 27. The front 24 has an opening 28 disposed adjacent the side 25. The auxiliary member 23 is disposed inside of the main member 4. A nut 29 is secured to the rear face of the front 24 and into the nut is threaded a screw 30 mounted to move in the slot 10 which is fashioned in the front 5 of the main member 4, the forward end of the screw being provided with a head 31 adapted to bear on the forward face of the front 5 of the main member 4 on opposite sides of the slot 10.

The invention comprises an auxiliary member 32 including a front 33 and a side 34. The upper edge of the front 33 of the auxiliary member 32 slides in the top guide 26 of the auxiliary member 23, and the lower edge of the front 33 slides in the bottom guide 27 of the auxiliary member 23. The rear edge of the side 34 of the auxiliary member 32 is received slidably in the rear guide 17 of the main member 14, and in this connection it may be observed that the rear edge of the side 25 of the auxiliary member 23 slides in the rear guide 9 of the main member 4. The front 33 of the auxiliary member 32 has a hole 35 corresponding to the hole 28. A nut 36 is secured to the rear face of the front 33 of the auxiliary member 32, and into the nut 36 is threaded a screw 37 mounted to move in the slot 22 of the main member 14, the screw 37 having a head 38 bearing against the forward face of the front 15 of the main member 14.

In practical operation, the main member 14 and the main member 4 are moved apart horizontally, and the auxiliary member 32 and the auxiliary member 23 are moved apart horizontally until the sides 6, 16, 25 and 34 coöperate with the sides 3 of the pigeon hole. Then the auxiliary members 23 and 32 are moved vertically until they engage the top 1 of the pigeon hole, the forward end of the pigeon hole being closed. The screws 37 and 30 then are tightened down, to prevent the structure from telescoping vertically. The screw 19 is advanced until its point 20 enters the bottom 2 of the pigeon hole, the screw constituting a means for preventing the twine holder from moving forwardly and rearwardly in the pigeon hole. One or more balls of string may be placed in the pigeon hole, the free ends of the balls being led outwardly through the holes 28 and 35.

Having thus described the invention, what is claimed is:—

A twine holder adapted to be inserted into a pigeon hole and open at the top, bottom and back, the holder comprising two pairs of L-shaped plates, the pairs of plates being overlapped slidably to permit an expansion of the holder in one direction, in one plane, and the plates of each pair being overlapped slidably on each other to permit an expansion of the holder in the same plane, and in a direction at right angles to the first specified direction, the front portion of one plate having a twine-receiving opening; means for maintaining the holder expanded in one of said directions to fit in a pigeon hole; and means movable on one of the plates, for engagement with a structure having a pigeon hole, to prevent the holder from sliding out of the pigeon hole.

In testimony that I claim the foregoing as my own, I have hereto affixed my signature in the presence of two witnesses.

WILLIAM GEORGE BRUNING.

Witnesses:
  ED. McMAHON,
  EDWARD J. ROBINS.

Copies of this patent may be obtained for five cents each, by addressing the "Commissioner of Patents, Washington, D. C."